United States Patent
Muetzel et al.

(10) Patent No.: US 9,214,073 B2
(45) Date of Patent: Dec. 15, 2015

(54) NON-BATTERY OPERATED CONTAINER ALERT SYSTEM

(71) Applicant: ZF Friedrichshafen AG, Friedrichshafen (DE)

(72) Inventors: Ronald Muetzel, Hawthorn Woods, IL (US); Thomas Roesch, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 10 days.

(21) Appl. No.: 13/961,351

(22) Filed: Aug. 7, 2013

(65) Prior Publication Data

US 2015/0042482 A1    Feb. 12, 2015

(51) Int. Cl.
| | |
|---|---|
| G08B 21/00 | (2006.01) |
| G08B 13/14 | (2006.01) |
| G01F 23/292 | (2006.01) |
| G01F 23/26 | (2006.01) |
| G08B 13/08 | (2006.01) |

(52) U.S. Cl.
CPC .............. *G08B 13/149* (2013.01); *G01F 23/26* (2013.01); *G01F 23/292* (2013.01); *G08B 13/08* (2013.01)

(58) Field of Classification Search
CPC .... G01F 23/26; G01F 23/292; G01F 23/2928
USPC ................................................ 340/686.1, 612
See application file for complete search history.

(56) References Cited

U.S. PATENT DOCUMENTS

| | | | | |
|---|---|---|---|---|
| 6,634,279 | B2 * | 10/2003 | D'Antonio et al. | 99/285 |
| 6,922,144 | B2 * | 7/2005 | Bulin et al. | 340/612 |
| 7,710,283 | B1 * | 5/2010 | Cantolino | 340/612 |
| 8,665,083 | B2 * | 3/2014 | Easley et al. | 340/612 |
| 2010/0101317 | A1 * | 4/2010 | Ashrafzadeh et al. | 702/188 |
| 2010/0106446 | A1 * | 4/2010 | Ashrafzadeh et al. | 702/116 |

* cited by examiner

*Primary Examiner* — John A Tweel, Jr.
(74) *Attorney, Agent, or Firm* — Brinks Gilson & Lione

(57) ABSTRACT

A container alert system may include an actuator with a generator that creates electrical energy upon activation of the actuator. The system may utilize the electrical energy to transmit a signal to a receiver based on characteristics of the container, such as use of the container, volume of the material in the container, available capacity of the container, material being added to the container, and location of the container.

19 Claims, 3 Drawing Sheets

NON-BATTERY OPERATED CONTAINER ALERT SYSTEM

BACKGROUND

Refuse containers are used at nearly every business or residential location in the United States and throughout the world that generates waste material, including refuse or recyclables. Consequently, storage and removal of the waste material is a major task that requires a significant amount of resources, including money, time, and human resources. Waste material is typically stored in a container, such as a refuse container, prior to collection and removal. Customers that pay for waste removal typically pay for this service based on the amount of waste material removed and the number of refuse container collections. Increasing the size of the refuse container may decrease the frequency of collections, but larger containers present several problems. Larger containers take up additional space, which is not often not readily available. Larger containers also require specialized equipment to pick up and remove or empty the waste material from the containers. Optimizing collection of the waste material from the containers can reduce waste removal costs.

Customers that pay for waste removal must also contend with unauthorized use of their refuse containers, such as by third-parties depositing material in their containers or stealing their containers. Unauthorized use of the customers' containers increases the cost of waste removal. Implementing monitoring procedures to optimize collection of waste material and prevent unauthorized use of containers is often costly or impossible due to the typically remote and mobile nature of refuse containers.

Therefore, there is a need for a container alert system that can operate remotely and without the use of batteries.

SUMMARY OF THE INVENTION

The descriptions below include systems and methods for transmitting signals from non-battery powered container alert devices.

According to one aspect, a container alert system may attach to a container and may comprise an actuator coupled to a generator. The container alert system may also comprise a transmitter connected to the generator. The generator may be operable to generate electrical energy without the use of a battery to power the transmitter upon activation of the actuator. The transmitter may be operable to send a signal upon activation of the actuator. The signal may be indicative of at least one characteristic of the container.

According to another aspect, a method of operating a container alert system attached to a container may comprise generating electrical energy upon activation of a actuator that is attached to a container; powering a transmitter with the electrical energy; and sending a signal from the transmitter, wherein the signal is indicative of at least one characteristic of the container.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The exemplary systems and methods described below may be more fully understood by reading the following description in conjunction with the drawings, in which.

DETAILED DESCRIPTION

The exemplary systems and methods as described herein may be embodied in a number of different forms. Not all of the depicted components may be required and some implementations may include additional, different, or fewer components from those expressly described in this disclosure. Variations in the arrangement and type of the components may be made without departing from the spirit or scope of the claims as set forth herein.

A non-battery powered container alert system may produce electrical energy when activated. The system may utilize the electrical energy to transmit a signal to a remote receiver. By producing its own electrical energy, the system may advantageously be available to transmit a signal to a remote receiver without regard to an external power source, such as a battery. The signal may be indicative of a characteristic of the container, such as, for example, use of the container, volume of the material in the container, available capacity of the container, material being added to the container, or the location of the container. The signal may apprise others of the container status including, for example, whether the container has available capacity or needs to be emptied. While the container alert system may be described in relation to a refuse container, the container alert system may be applicable to other containers and should be interpreted as pertaining to any type of container.

A radio-controlled switch, for example, a snap-action switch, with an antenna, a transmitter assembly, and a generator may be used in the container alert system. The antenna may be electrically connected to the transmitter assembly to emit a signal that can be generated by the transmitter assembly. The transmitter assembly may be located on a circuit carrier and the antenna may be held on a carrier substrate within the radio-controlled switch that is separate from the circuit carrier. An example radio-controlled switch may be found in commonly-assigned U.S. patent application Ser. No. 13/636,306, the contents of which are incorporated herein by reference in their entirety. An example generator may be found in commonly-assigned U.S. patent application Ser. Nos. 13/636,307 and 13/636,309, the contents of which are incorporated herein by reference in their entirety.

Figure 1B:
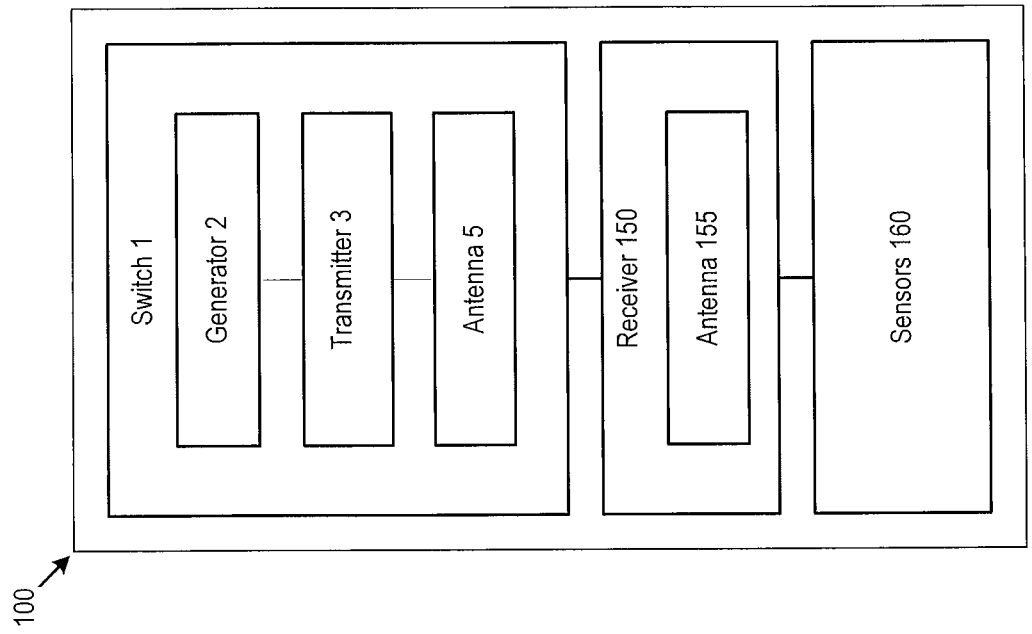
FIG. 1B is a schematic diagram of an example of a radio-controlled switch according to an exemplary container alert system.
Figure 1A:
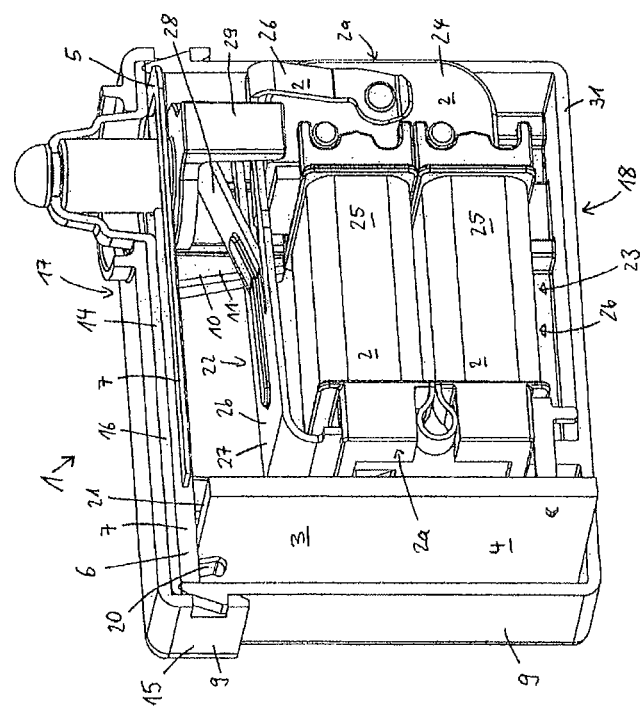
FIG. 1A is a cross section of an example of a radio-controlled switch according to an exemplary container alert system.

FIG. 1A shows the cross section of exemplary switch 1, which is particularly implemented as an energy-independent radio-controlled switch. Such an energy-independent switch draws its energy from actuation or movement from which generator 2 may generate electricity. Generator 2 may be an induction generator, a piezo generator, or any other generating device. Generator 2 may provide energy to transmitter assembly 3 or other devices. The energy may be buffered, for example, in a capacitor or an inductor.

Switch 1 may be any type of actuator, for example, a snap-action switch, in which a magnetic element is mechanically accelerated by a spring load during a movement of the magnetic element to reverse the polarity of the core of an induction coil of the generator. In general, switch 1 may be implemented as a monostable (one resting position), bistable (two resting positions), or metastable (stable against small changes, unstable against larger changes) radio-controlled switch. Switch 1 may be a mechanical switch, a pendulum, or a piezoelectric device.

Transmitter assembly 3 may generate a signal using the generated energy. Transmitter assembly 3 may be connected to antenna 5 such that the signal may be emitted as a radio signal from antenna 5. Transmitter assembly 3 may include circuitry to condition, modulate, or format the transmitted signal into a particular type of wireless signal. For example, the transmitter assembly may modulate the signal according to modulation schemes known in the art, such as FM, AM, and PM, or more sophisticated schemes such as CDMA. Transmitter assembly 3 may advantageously condition the signal to comply with a wireless standard, such as IEEE 802.11. Transmitter assembly 3 may have circuit carrier 4, for example, in the form of a circuit board, which supports the electronics of transmitter assembly 3. Antenna 5 may be held on carrier substrate 6, for example, an antenna carrier, which is separate from circuit carrier 4 of transmitter assembly 3. Circuit carrier 4 and carrier substrate 6 may be separate substrates, which may advantageously reduce interference between circuits deposed on circuit carrier 4 and antenna 5.

Generator 2 in switch 1 may be small yet still provide high energy upon actuation or movement of switch 1. Generator 2 may be a miniaturized generator 2 in the form of an induction snap generator in which magnetic element 24 is moved relative to induction coil 25. In addition, further compact generators may be used for generator 2, for example, that make use of other mechanisms for energy generation. An example is piezo generators. When generator 2 is implemented as a snap generator, a high acceleration of the magnetic element 24 between two resting points may cause a high temporal change in the magnetic flux, whereby the polarity of the generator core is reversed from the polarity of a switch in the rest position. The change in magnetic flux may cause generator 2 to generate electrical energy.

To generate electrical energy, magnet element 24 may have a permanent magnet, and at least one induction coil with a coil core. Magnet element 24 may be arranged adjacent to the induction coil, and may be movable relative to the coil core to generate a flux change in the core and generate an induction voltage by means of the induction coil. The energy generated by the flux change may be emitted or transferred to another assembly of switch 1, for example, transmitter assembly 3, or may be stored, for example, in a rechargeable battery, capacitor, or ultra-capacitor.

The activation of switch 1 may generate the force to move magnetic element 24 between the two resting points. Activation may occur in the form of, for example, a snap movement. To generate a snap movement, spring element 26 connected to magnetic element 24 may be increasingly stressed during its movement between the resting positions, until magnetic element 24 has reached a middle point between the resting positions. Upon reaching the middle point, energy stored by the stress on spring element 26 may be used for the mechanical acceleration of magnetic element 24 towards the resting position to be assumed by means of release of spring element 26, resulting in an extremely accelerated approach of magnetic element 24 towards the core. Between the resting positions, magnetic element 24 may be moved away from contact with the flanks and moved along a suitable path, e.g. a circular arc shaped path that permits an increasing and decreasing spring stress.

Additionally or alternatively, the movement of switch 1 may generate the force to move magnetic element 24, thereby causing the generator to create electrical energy. Movement of switch 1 from a stationary position to a non-stationary position may cause magnetic element 24 to move between resting positions, which may cause generator 2 to generate electrical energy. Similarly, continued movement of switch 1 may cause magnetic element 24 to move, and may cause the generator 2 to generate electrical energy.

FIG. 1B is a schematic diagram of container alert system 100. Container alert system 100 may also include additional components not shown in FIG. 1B. Container alert system 100 may include switch 1, receiver 150, and antenna 155. The components of container alert system 100 shown in FIG. 1B may correspond in function to similarly numbered components shown in FIG. 1A. Switch 1 (which may include generator 2, transmitter 3, antenna 5), receiver 150, antenna 155, and sensors 160 may be housed within a single device, as shown in FIG. 1B, or may be housed in separate devices that are in communication with each other. Transmitter 3 and receiver 150 may be combined into a transceiver. Further, one of antenna 5 or antenna 155 may be unnecessary where transmitter 3 and receiver 150 may share one antenna, or where a transceiver is employed in place of transmitter 3 and receiver 150. Sensors 160 may be one more sensors to sense any physical condition or the environment. For example, sensors 160 may include accelerometers, pressure sensors, weight sensors, inclinometers, image sensors, gas detectors, thermometers, or optical sensors.

Figure 2:
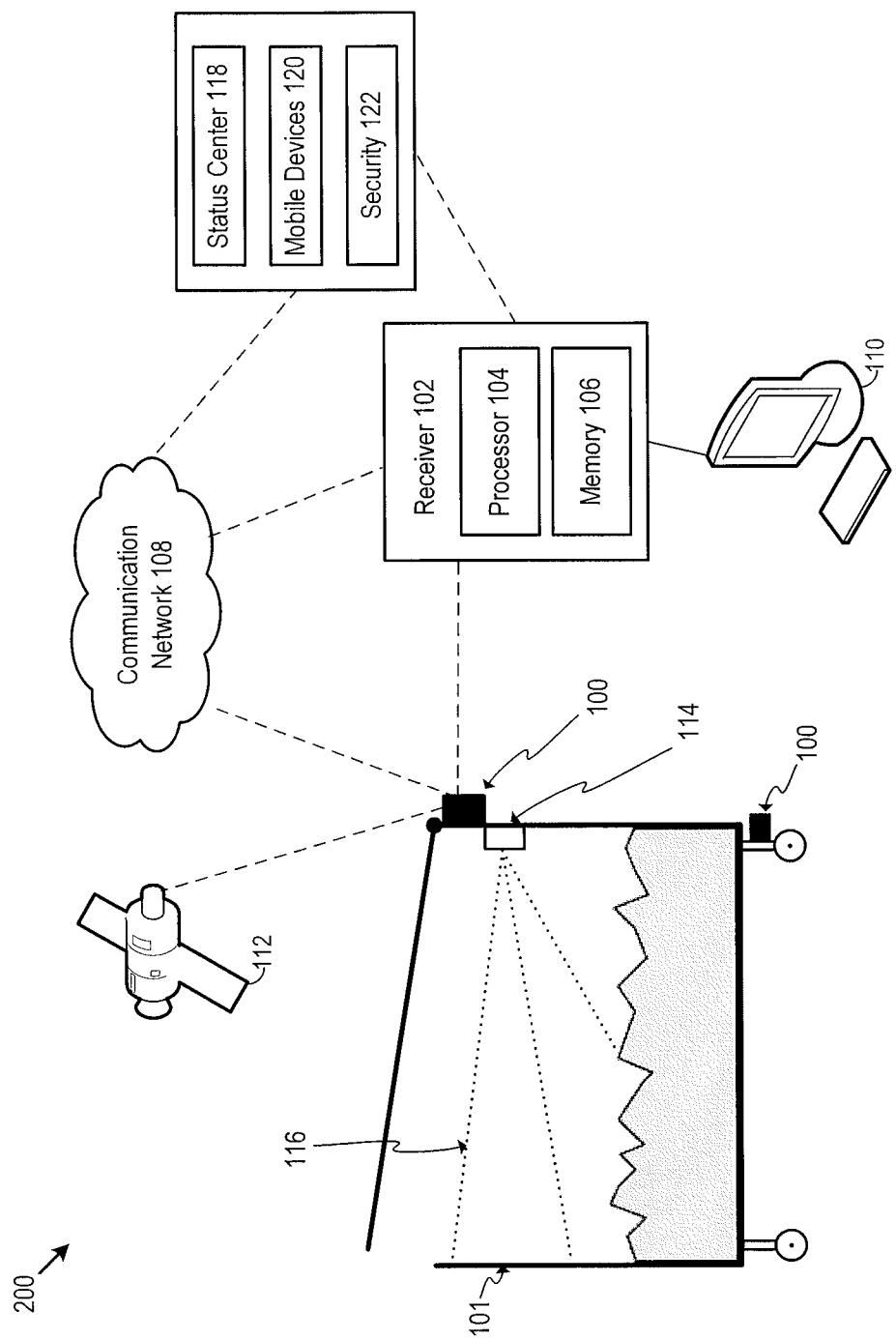
FIG. 2 is a diagram of an exemplary container alert system.

FIG. 2 is a diagram of exemplary container alert system 200. Container alert system 200 may include device 100 shown and described in relation to FIG. 1B. The size and shape of device 100 shown in FIG. 2 is for illustrative purposes only. Device 100 may take any size or shape dictated by design requirements. Container alert system 200 may include a container 101 and receiver 102. Container 101 may be any type of container, such as, for example, a shipping container, a storage container, a cargo container, an open-top container, a platform container, a refrigerated container, an insulated container, or a tank container. Container 101 may hold any type of material. Container 101 shown in FIG. 2 may be a refuse container.

Receiver 102 may include processor 104 and memory 106. Receiver 102 may communicate with device 100 directly or through communication network 108. Alternatively, receiver 102 may be a transceiver that includes capabilities to send signals to device 100. Communication network 108 may be any number of communication networks and may take any number of forms, such as a wireless network. Device 100 may communicate with receiver 102 according to any number of communication protocols, standards, networks, or topologies. As examples, device 100 may communicate across cellular networks or standards (e.g., 2G, 3G, Universal Mobile Telecommunications System (UMTS), GSM® Association, Long Term Evolution (LTE)™, or more), WiMAX, Bluetooth, WiFi (including 802.11 a/b/g/n/ac or others), WiGig, Global Positioning System (GPS) networks, and others available at the time of the filing of this application or that may be developed in the future. Device 100 and receiver 102 may include processing circuitry, data ports, transmitters, receivers, transceivers, or any combination thereof to communicate across any of the above-listed protocols, standards, networks, or topologies. Receiver 102 may be in communication with computer 110. Computer 110 may be any known computer processing device that is capable of storing and processing commands and instructions, such as, for example, a server, computer, tablet, smartphone, or personal data assistant. Receiver 102 and computer 110 may be directly linked, as shown in FIG. 2, or may be housed in a single unit. Alternatively, receiver 102 may communicate with computer 110 through one or more communication networks, such as communication network 108, as previously described. Receiver 102 may be remote from device 100, as shown in FIG. 2, or may be attached or in close proximity to device 100.

Container alert system 200 may generate electrical energy and transmit a signal when switch 1 in device 100 is activated. As previously described, generator 2, contained in device 100, may create electrical energy when a magnet element is moved by the activation of switch 1. Switch 1 may be activated in a variety of ways, including for example, when a lid on container 101 is moved. The device 100 may be attached to container 101 near the lid, as shown in FIG. 2, such that opening or closing the lid may activate switch 1 in device 100. Additionally or alternatively, device 100 may be located inside container 101 near the bottom, such that adding material, such as refuse, to container 101 may activate switch 1 by coming in contact with switch 1 or by coming in contact with a portion of container 101 that is in contact with switch 1. Additionally or alternatively, device 100 may be located outside near the base of container 101, as shown in FIG. 2, such that downward movement of container 101 activates switch 1 in device 100. The downward movement may be caused by adding material to container 101. The placement of device 100 in FIG. 2 is for illustrative purposes only. Device 100 can be attached to a variety of locations on container 100. Switch 1 may also be activated manually by a user.

Container alert system 200 may include multiple devices 100, as shown in FIG. 2, or may include only a single device 100. Multiple devices 100 may be redundant and perform substantially the same task. Additionally or alternatively, multiple devices 100 may perform different tasks and work in a coordinated fashion. Each of devices 100 may be in communication with the other devices 100. Each of devices 100 may also be in communication with receiver 102, as previously described.

Device 100 may include a mechanism to store energy that is created when device 100 is activated. The stored energy may be used by device 100 to transmit a signal when device 100 is not generating electricity, such as when device 100 is not activated. The mechanism to store energy may include a rechargeable storage battery, a capacitor, an ultra-capacitor, or other energy storage device, if the stored energy is electrical. The mechanism to store energy may include a spring or other mechanical device where the stored energy is mechanical. Stored mechanical energy may be converted to electrical energy by generator 2. By creating its own electrical energy, device 100 may be energy independent and may not require a separate power source, such as a battery or a building's electrical circuitry. As such, device 100 may be reliably operable to transmit a signal because it advantageously does not rely on a separate power source. In this way, device 100 may advantageously always be operable due to its lack of reliance on an external power source.

Device 100 may use the electrical energy generated by generator 2 to transmit a signal from transmitter 3 and antenna 5. Device 100 may be configured to transmit a signal when device 100 is activated. The activation to cause device 100 to transmit a signal may be the same type of activation that was described in relation to device 100 generates electrical energy. Additionally or alternatively, device 100 may be configured to transmit a signal at predefined time intervals, such as every minute or every hour. The time intervals may be modified by a user or other party with access to container alert system 200. Additionally or alternatively, device 100 may be configured to transmit a signal based on a combination of activation and time intervals. Using such a combination may allow device 100 to efficiently use the electrical energy created by generator 2. For example, device 100 may be configured to transmit a signal when activated and to also transmit a signal at specified time intervals when device 100 is not activated. Any other combinations of activation and time intervals may be used by device 100 to transmit a signal.

The signals transmitted by device 100 may be received by receiver 102. The signals may be transmitted wirelessly through communication network 108, as previously described, or may be sent wireless directly from device 100 to receiver 102. Additionally or alternatively, the signals may be transmitted through a hardwire connection between device 100 and receiver 102.

The signals transmitted by device 100 may include characteristics regarding container 101. The characteristics may provide information about container 101's location, use, or available capacity, or whether container 101 is full and needs to be emptied. Receiver 102 may receive the signals and may process the signals based on the characteristics of device 100. Processor 104 in receiver 102 may process signals based on logic or instructions stored in memory 106. The signals containing the characteristics may advantageously allow a recipient of the signals to make an informed decision regarding if container 101 needs to be visited or emptied, which may prevent an unnecessary excursion to inspect the available capacity of container 101.

The characteristics may be related to the manner in which switch 1 was activated, such as, for example, opening or closing of the lid of container 101 or adding material to container 101. The characteristics may also provide information regarding the available capacity of container 101, such as, for example, the volume of material in container 101 or the weight of material within or added to container 101. The characteristics may also provide information regarding the location of container 101. Container alert system 200 may determine the location of device 100 by any known means, such as by communication with global positioning satellites 112, as shown in FIG. 2, or by other navigation, triangulation, or signal location methods.

Container alert system 200 may include one or more optical sensors 114 to determine the available capacity of container 101. Optical sensor 114 may emit one or more light beams 116 within container 101. Light beams 116 may be infrared light or light in the visible range of the frequency spectrum. Optical sensor 114 may detect an interruption in light beams 116 caused by material in container 101. An interruption of a light beam 116 may indicate that the volume of space in the vicinity of the light beam is occupied by material. The light beams 116 may be directed to a variety of locations and levels within container 101, as shown in FIG. 2, to determine which portions of container 101 are occupied with material. Optical sensor 114 may be in communication with device 100. Optical sensor 114 may be powered by the electricity generated by generator 2 in device 100. A signal transmitted from device 100 to receiver 102 regarding the material detected by optical sensor 114's light beams 116 may allow receiver 102 to determine the available capacity of container 101. For example, receiver 102 may determine container 101 is completely full if all the light beams 116 are interrupted by material or receiver 102 may determine container 101 has some available capacity if only some of the light beams 116 are interrupted by material. Accordingly, receiver 102 may determine that container 101 is full and needs to be emptied based on information from optical sensor 114. Using optical sensors 114 to determine if container 101 is full may advantageously prevent an unnecessary excursion to examine the available capacity of container 101.

Additionally or alternatively, container alert system 200 may determine that container 101 is full or that the available capacity of container 101 needs to be examined based on other methods, such as how often the lid of container 101 has been opened. Device 101 may transmit a signal to receiver 102 each time the lid on container 101 is opened. Receiver 102 may estimate the available capacity of container 101 based on the number of times the lid of container 101 has been opened in a given time period. Receiver 102 may keep historical records for a container 101 regarding the frequency of its lid being opened and the available capacity of container 101 at corresponding times. Receiver 102 may use the historical records to estimate the available capacity of container 101 based on how often the lid has been opened. For example, receiver 102's records may indicate that a container is typically half full when its lid has been opened twenty times and that the container typically has no available capacity after its lid has been opened fifty times. Receiver 102 may then estimate that the container is more than half full, but less than completely full if the lid has been opened thirty times. Receiver 102 may then send a signal indicating that the container is not in need of emptying, which may advantageously prevent unnecessarily visiting the container to inspect its available capacity.

Additionally or alternatively, container alert system 200 may determine that container 101 is full or that the available capacity of container 101 needs to be examined by the frequency of material being added to container 101. Receiver 102 may estimate the available capacity of container 101 based on how often material was added to container 101 in a given time period. Container alert system 200 may detect that material was added to container 101 by transmitting a signal from device 100 located at the base of container 101, as shown in FIG. 2, each time there is a downward movement of container 101. The downward movement may be caused by material being added to container 101. Device 101 may transmit a signal to receiver 102 each time material is added to container 101. As previously discussed, receiver 102 may keep historical records for a container 101 regarding the frequency of material being added and the available capacity of container 101 at corresponding times. Receiver 102 may use the historical records to estimate the available capacity of container 101 based on how often material has been added. Receiver 102 may send a signal regarding the frequency of material being added to container 101 to advantageously prevent unnecessary visits to the container to inspect its available capacity.

Similarly, container alert system 200 may determine that container 101 is full or that the available capacity of container 101 needs to be examined based on a change in weight of the material in container 101. Container alert system 200 may detect that material was added to container 101 by detecting each time there is a downward movement of container 101. Receiver 101 may correlate each downward movement of container 101 with a change in weight of material in container 101. Alternatively or additionally, device 100 may include a weight sensor to detect the weight of container 101. Receiver 102 may send a signal regarding the change in weight of material being added to container 101 to advantageously prevent unnecessary visits to the container to inspect its available capacity.

Receiver 102 may transmit signals to other parties and devices regarding the characteristics of container 101. The signals may provide information about container 101's use, container 101's available capacity, or that container 101 is full and needs to be emptied. Receiver 102 may communicate directly with the other parties and devices or may communicate through communication network 108. For example, receiver 102 may transmit signals with information regarding the available capacity of container 101 to a central status center 118. The central status center 118 may maintain information regarding the available capacity for multiple containers 101 and may dispatch a vehicle to inspect the available capacity of containers 101 and empty full containers as needed. The central status center may advantageously use the signals containing information regarding the available capacity of containers 101 to efficiently empty and generally maintain the containers 101.

Additionally or alternatively, receiver 102 may transmit signals to mobile devices 120 regarding the characteristics of container 101. The signals may allow a carrier of mobile device 120 to know the status, such as the available capacity, of container 101 without communicating with a central status or dispatch center. Mobile devices 120 may include any device that is portable, is able to communicate with a communication network, and is able to process and relay information, for example, cellular phones, smartphones, tablet computers, or laptop computers.

Additionally or alternatively, receiver 102 may transmit signals regarding characteristics of container 101 to security services 122, such as a security department, surveillance office, or police department. Receiver 102 may include a clock or a timer that determines the time and date when a signal regarding the characteristics of container 101 is received from device 100. Receiver 102 may also include a list or database of predefined time periods when container 101 is authorized to be used, such as the operating hours at the business where container 101 is located. The predefined time periods may be adjusted or modified as necessary. The signal from device 100 may provide information regarding use of container 101, such as if the lid on container 101 was opened or if material was added to container 101. Receiver 102 may process the signal indicating container 101 was used along with the time container 101 was used to determine if the use of container 101 was abnormal, unauthorized, improper, or illegal. Receiver 102 may send an alert signal to security services 122 indicating that container 101 was used in an authorized manner. Security services 122 may take any appropriate action upon receipt of the unauthorized use signal, such as visiting container 101 or beginning electronic surveillance of container 101. Accordingly, container alert system 200 may advantageously improve the security of container 101 by alerting responsible parties regarding unauthorized use of container 101 at or near the time the use occurs and without requiring a witness to report the unauthorized use.

Receiver 102 may transmit signals regarding the location of container 101 to others, such as central status center 118 or security services 122. Receiver 102 may include a list or database of predefined areas in which container 101 is authorized to be located, such as the address of a business that utilizes container 101. The predefined areas may be adjusted or modified as necessary. Receiver 102 may process the location signals received from device 100 and determine if container 101 is in an authorized location. Receiver 102 may send an alert signal indicating that container 101 is at an unauthorized location. Security services 122, or another party, may take any appropriate action upon receipt of the unauthorized location signal, such as visiting container 101's location. Accordingly, container alert system 200 may advantageously improve the security of container 101 by alerting responsible parties regarding an unauthorized location of container 101 at or near the time when it occurs and without requiring a witness to report the unauthorized use.

Figure 3:
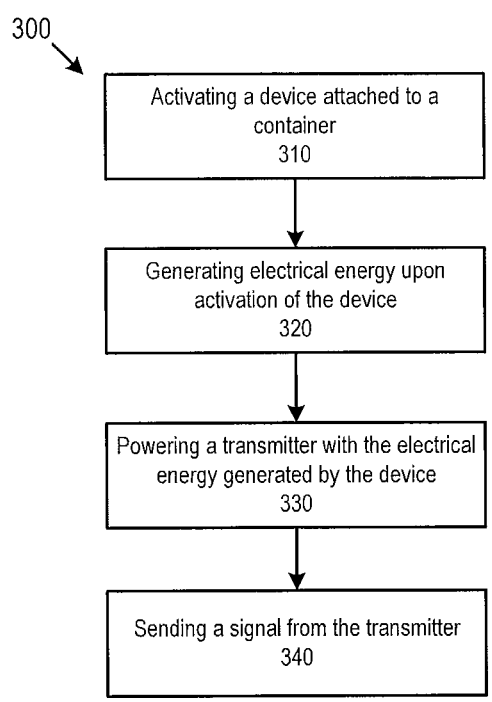
FIG. 3 is a flow diagram of a method for operating an exemplary container alert system.

FIG. 3 is a flow diagram of a method for operating an exemplary container alert system. Method 300 may be implemented as hardware, software, or both, for example in device 100, receiver 102, computer 110, or any combination. Method 300 may start at step 310 by activating a device attached to a container, where the device includes a switch, a generator, and a transmitter. At step 320, the device may generate electrical energy as a result of the activation in step 310. At step 330, the electrical energy generated in step 320 may power a transmitter in the device. At step 340, the transmitter may send a signal. The signal may be indicative of at least one characteristic of the container, such as use of the container, volume of the material in the container, available capacity of the container, material being added to the container, and location of the container.

Methods or processes may be implemented, for example, using a processor and/or instructions or programs stored in a memory. Specific components of the disclosed embodiments may include additional or different components. A processor may be implemented as a microprocessor, microcontroller, application specific integrated circuit (ASIC), discrete logic, or a combination of other types of circuits or logic. Similarly, memories may be DRAM, SRAM, Flash, or any other type of memory. Parameters, databases, and other data structures may be separately stored and managed, may be incorporated into a single memory or database, or may be logically and physically organized in many different ways. Programs or instruction sets may be parts of a single program, separate programs, or distributed across several memories and processors.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

The invention claimed is:

1. A container alert system for attachment to a container, the system comprising:
   an actuator coupled to a generator, the actuator located outside and underneath the container; wherein the actuator is activated when the container moves in a downward direction due to material being added to the container;
   a transmitter connected to the generator, wherein the generator is a snap generator in which a magnetic element is accelerated by a spring;
   wherein the generator is operable to generate electrical energy without the use of a battery to power the transmitter upon activation of the actuator;
   wherein the transmitter is operable to send a signal upon activation of the actuator and wherein the signal is indicative of at least one characteristic of the container.

2. The container alert system of claim 1, wherein the transmitter is further operable to transmit the signal at a predefined time interval.

3. The container alert system of claim 1, wherein the characteristic of the container includes an indication of material being added to the container.

4. The container alert system of claim 1, wherein the characteristic of the container includes a location of the container.

5. The container alert system of claim 4, wherein the signal triggers an alert when the container is located outside a predefined area.

6. The container alert system of claim 1, wherein the characteristic of the container is indicative of a volume of material in the container.

7. The container alert system of claim 1, wherein movement of a container lid activates the actuator.

8. The container alert system of claim 1, wherein the actuator is a snap-action switch in which a magnetic element is accelerated by a spring when the actuator is activated.

9. The container alert system of claim 1, further comprising an optical sensor operable to utilize the electrical energy to detect the presence of material in the container and wherein the characteristic of the container is indicative of the detection of material by the optical sensor.

10. The container alert system of claim 1, wherein the signal is a first signal and further comprising a remote receiver that is operable to receive the first signal and send a second signal to a remote party, wherein the second signal is indicative of the at least one characteristic of the container.

11. The container alert system of claim 10, wherein the remote party is a security service.

12. The container alert system of claim 10, wherein the second signal is indicative of a time of day when material is added to the container.

13. A container alert system for attachment to a container, the system comprising:
   an actuator coupled to a generator;
   a transmitter connected to the generator;
   wherein the generator is operable to generate electrical energy without the use of a battery to power the transmitter upon activation of the actuator;
   wherein the transmitter is operable to send a first signal upon activation of the actuator and wherein the first signal is indicative of at least one characteristic of the container; and
   a remote receiver that is operable to receive the first signal and send a second signal that is indicative of material being added to the container and a time when material is added to the container and wherein the second signal triggers an alert when material is added to the container outside a predefined time period.

14. The container alert system of claim 1, wherein the actuator is selected from a group consisting of a switch, pendulum, lug, or piezoelectric device.

15. A method of operating a container alert system attached to a container, the method comprising:
   activating an actuator that is attached outside and underneath a container, wherein the actuator is activated when the container moves in a downward direction due to material being added to the container;
   generating electrical energy with a generator upon activation of the actuator, wherein the generator is a snap generator in which a magnetic element is accelerated by a spring;
   powering a transmitter with the electrical energy; and
   sending a signal from the transmitter, wherein the signal is indicative of at least one characteristic of the container.

16. The method of operating a container alert system attached to a container of claim 15, wherein the actuator is a snap-action switch in which a magnetic element is accelerated by a spring when the actuator is activated.

17. The method of operating a container alert system attached to a container of claim 15, wherein the characteristic of the container is indicative of a volume of material in the container.

18. The method of operating a container alert system attached to a container of claim 15, further comprising receiving the signal in a remote receiver and sending a second signal from the remote receiver to a remote party, wherein the second signal is indicative of the at least one characteristic of the container.

19. The method of operating a container alert system attached to a container of claim 18, wherein the remote party is a security service.

* * * * *